(12) United States Patent (10) Patent No.: US 12,679,207 B2

Matsunobu et al. (45) Date of Patent: Jul. 14, 2026

(54) IN-VEHICLE DISPLAY SYSTEM

(71) Applicant: TOYOTA JIDOSHA KABUSHIKI KAISHA, Toyota (JP)

(72) Inventors: Go Matsunobu, Okazaki (JP); Kazuhisa Ishimaru, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 19/093,386

(22) Filed: Mar. 28, 2025

(65) Prior Publication Data

US 2025/0388085 A1 Dec. 25, 2025

(30) Foreign Application Priority Data

Jun. 21, 2024 (JP) .................................. 2024-100705

(51) Int. Cl.
B60K 35/233 (2024.01)
B60K 35/22 (2024.01)

(52) U.S. Cl.
CPC ............ B60K 35/233 (2024.01); B60K 35/22 (2024.01); B60K 2360/177 (2024.01); B60K 2360/178 (2024.01); B60K 2360/1868 (2024.01); B60K 2360/21 (2024.01)

(58) Field of Classification Search
CPC ............ B60K 35/233; B60K 2360/177; B60K 2360/178; B60K 2360/1868; B60K 2360/21; B60K 35/22; B60K 35/28; B60K 2360/179
See application file for complete search history.

(56) References Cited

U.S. PATENT DOCUMENTS

| | | | |
|---|---|---|---|
| 2010/0164702 A1* | 7/2010 | Sasaki .................... | G02B 27/01 |
| | | | 345/7 |
| 2011/0222732 A1* | 9/2011 | Higuchi ................. | G08G 1/167 |
| | | | 382/104 |
| 2017/0038595 A1* | 2/2017 | Kutomi ................... | B60K 35/81 |
| 2017/0336222 A1* | 11/2017 | Yamaguchi ............ | G02B 27/01 |
| 2021/0131818 A1* | 5/2021 | Yamaguchi ........ | G02B 27/0101 |
| 2022/0396285 A1 | 12/2022 | Sunaba et al. | |

FOREIGN PATENT DOCUMENTS

| | | | | |
|---|---|---|---|---|
| JP | 2007055365 A | * | 3/2007 | |
| JP | 2022-189118 A | | 12/2022 | |
| JP | 7722956 B2 | * | 8/2025 | ............. G06F 17/10 |

* cited by examiner

*Primary Examiner* — Julie Anne Watko

(74) *Attorney, Agent, or Firm* — Oblon, McClelland, Maier & Neustadt, L.L.P.

(57) ABSTRACT

An in-vehicle display system includes: an angle estimation unit that estimates, based on an image captured by a camera, an angle provided by a straight line connecting an own vehicle and a preceding vehicle with respect to a front-rear direction of the own vehicle; an inter-vehicle distance estimation unit that estimates an inter-vehicle distance between the own vehicle and the preceding vehicle based on a detection result obtained by a radar sensor of the own vehicle; a height calculation unit that calculates a height of the preceding vehicle based on the angle and the inter-vehicle distance; a gradient estimation unit that estimates a gradient of a road ahead of the own vehicle based on a temporal change of the height of the preceding vehicle; and a display control unit that displays an icon on a windshield so that the icon is superimposed on a landscape ahead of the own vehicle.

5 Claims, 5 Drawing Sheets

Figure 1:
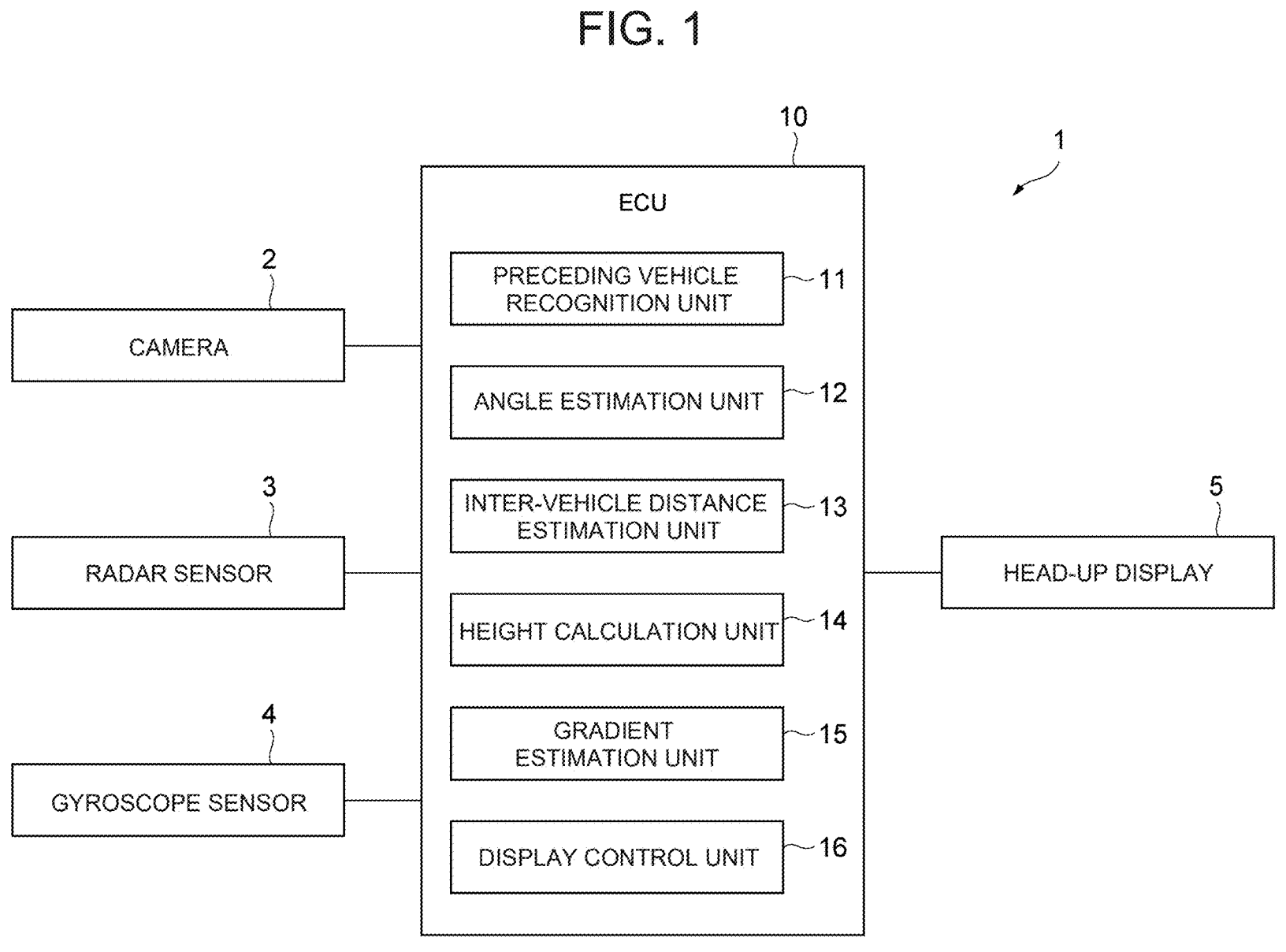

HEAD-UP DISPLAY 5

ECU 10

PRECEDING VEHICLE RECOGNITION UNIT 11

ANGLE ESTIMATION UNIT 12

INTER-VEHICLE DISTANCE ESTIMATION UNIT 13

HEIGHT CALCULATION UNIT 14

GRADIENT ESTIMATION UNIT 15

DISPLAY CONTROL UNIT 16

CAMERA 2

RADAR SENSOR 3

GYROSCOPE SENSOR 4

IN-VEHICLE DISPLAY SYSTEM

CROSS-REFERENCE TO RELATED APPLICATION

This application claims priority to Japanese Patent Application No. 2024-100705 filed on Jun. 21, 2024, incorporated herein by reference in its entirety.

BACKGROUND

1. Technical Field

The present disclosure relates to an in-vehicle display system.

2. Description of Related Art

Hitherto, Japanese Unexamined Patent Application Publication No. 2022-189118 (JP 2022-189118 A) is known as a technical document relating to an in-vehicle display system. JP 2022-189118 A discloses a technology of displaying an image on a display screen of a head-up display of an own vehicle so that the image is superimposed on a landscape ahead of the own vehicle.

SUMMARY

In the related art as described above, improvement in position accuracy of the image on the display screen of the head-up display is demanded in some cases.

The present disclosure has an object to provide an in-vehicle display system capable of achieving improvement in position accuracy of an image on a display screen of a head-up display.

The in-vehicle display system according to the present disclosure is an in-vehicle display system that displays an image on a display screen of a head-up display of an own vehicle, the in-vehicle display system including: a preceding vehicle recognition unit that recognizes a preceding vehicle traveling ahead of the own vehicle based on an image captured by a camera of the own vehicle; an angle estimation unit that estimates, based on the image captured by the camera, an angle provided by a straight line connecting the own vehicle and the preceding vehicle with respect to a front-rear direction of the own vehicle; an inter-vehicle distance estimation unit that estimates an inter-vehicle distance between the own vehicle and the preceding vehicle based on a detection result obtained by a sensor of the own vehicle; a height calculation unit that calculates a height of the preceding vehicle based on the angle estimated by the angle estimation unit and the inter-vehicle distance estimated by the inter-vehicle distance estimation unit; a gradient estimation unit that estimates a gradient of a road ahead of the own vehicle based on a temporal change of the height of the preceding vehicle; and a display control unit that displays the image on the display screen so that the image is superimposed on a landscape ahead of the own vehicle. The display control unit adjusts a position of the image on the display screen based on the gradient estimated by the gradient estimation unit.

With the present disclosure, it is possible to provide the in-vehicle display system capable of achieving improvement in position accuracy of the image on the display screen of the head-up display.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 1 is a block diagram of an in-vehicle display system of an embodiment;

DETAILED DESCRIPTION OF EMBODIMENTS

Figure 2:
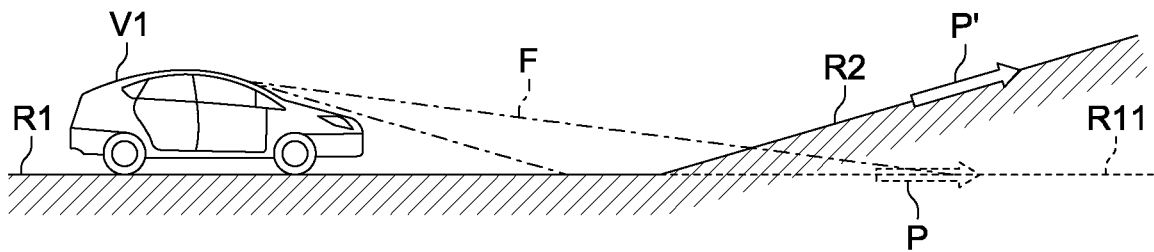
FIG. 2 is a schematic view illustrating a road ahead of an own vehicle.

Hereinafter, an embodiment of the present disclosure is described in detail with reference to the drawings.

FIG. 1 is a block diagram of an in-vehicle display system of the present embodiment. An in-vehicle display system 1 illustrated in FIG. 1 is used in, for example, an autonomous driving vehicle, a driving assistance vehicle, or the like. The in-vehicle display system 1 displays an image on a display screen of a head-up display 5 of an own vehicle V1 (see FIG. 2). As illustrated in FIG. 1, the in-vehicle display system 1 includes a camera 2, a radar sensor 3, a gyroscope sensor 4, a head-up display (HUD) 5, and an electronic control unit (ECU) 10. The in-vehicle display system 1 is installed on the own vehicle V1.

The camera 2 is imaging equipment that images an external situation of the own vehicle V1. The camera 2 is provided on, for example, the rear side of a windshield of the own vehicle V1. The camera 2 is a front camera that images the front side of the own vehicle V1. An optical axis of a lens of the camera 2 is in parallel with a front-rear direction of the own vehicle V1. The camera 2 may be a monocular camera or a stereo camera. The stereo camera includes two imaging units disposed so as to reproduce binocular parallax. Imaging information obtained by the stereo camera also includes information of the depth direction. The camera 2 transmits the captured image relating to the external situation of the own vehicle V1 to the ECU 10.

The radar sensor 3 is, for example, a millimeter wave radar or a lidar provided at a front end of the own vehicle V1. The radar sensor 3 emits radio waves or light toward the front side of the own vehicle V1. The radar sensor 3 receives the radio waves or light reflected by a target present ahead of the own vehicle V1 to detect the target. The radar sensor 3 detects a relative distance (an inter-vehicle distance) from the own vehicle V1 to a preceding vehicle V2 (see FIG. 3). The radar sensor 3 transmits a detection result to the ECU 10.

The gyroscope sensor 4 is a sensor for use in detecting a posture change of the own vehicle V1. For example, the gyroscope sensor 4 is provided at a vehicle body middle portion of the own vehicle V1. The gyroscope sensor 4 measures an angular velocity in order to detect rotational movement of the own vehicle V1. The gyroscope sensor 4 can detect angular velocities of three axes (an X axis, a Y axis, and a Z axis). The X axis corresponds to the front-rear direction of the own vehicle V1, the Y axis corresponds to the right-left direction of the own vehicle V1, and the Z axis corresponds to the height direction of the own vehicle V1. The gyroscope sensor 4 may use, for example a micro-electro-mechanical systems (MEMS) technology. The MEMS gyroscope sensor has a small size and can detect the angular velocity with high accuracy, and contributes to improvement in posture control and stability of the own vehicle V1. The gyroscope sensor 4 transmits the detected angular velocity information to the ECU 10.

The head-up display 5 is display equipment for driver mounted on the own vehicle V1. The head-up display 5 projects and displays an icon or the like (an image) onto a windshield (a display screen of the head-up display 5) of the own vehicle V1 so that the image is superimposed on a landscape ahead of the own vehicle V1 as viewed from the driver. The head-up display 5 includes, for example, a projection unit provided below a dashboard on the depth side of an instrument panel of the own vehicle V1. The projection unit radiates light to the windshield through an opening portion provided in the dashboard to project an image.

The head-up display 5 displays an icon or the like corresponding to a lane line of the road ahead, a driving path line of the own vehicle V1, or the like on the windshield of the own vehicle V1 at the time of executing, for example, driving assistance control such as a lane keeping assist system (LKAS) or lane departure warning (LDW) with respect to the own vehicle V1. The head-up display 5 displays the icon or the like corresponding to the lane line or the like at, within the windshield, an intersection (a display position) between the windshield and a line of sight of the driver observing the lane line of the road ahead or the like (an imaginary line connecting the lane line or the like and an eye of the driver).

The ECU 10 is an electronic control unit including a central processing unit (CPU) and a storage unit such as a read only memory (ROM) or a random access memory (RAM). In the ECU 10, for example, a program stored in the storage unit is executed by the CPU so that various functions are implemented. For example, the ECU 10 is provided on the own vehicle V1.

FIG. 2 is a schematic view illustrating a road ahead of the own vehicle. As illustrated in FIG. 2, a road R2 ahead of the own vehicle V1 has a gradient in some cases. That is, the road R2 ahead is inclined with respect to a road R1 on which the own vehicle V1 travels in some cases. In the present embodiment, the road R2 ahead is an upslope. The head-up display 5 displays, for example, an icon corresponding to a lane line P' of the road R2 ahead on the windshield. When the icon corresponding to the lane line P is displayed on the windshield assuming that a line of sight F of the driver is on an extension line R11 of the road R1 (assuming that the lane line P is positioned on the extension line R11) although the road R2 ahead has a gradient, the icon is displayed at a position shifted from the lane line P' on the windshield in some cases. The in-vehicle display system 1 adjusts the position of the icon on the windshield based on the gradient of the road R2 ahead.

The ECU 10 includes, as functional configurations, a preceding vehicle recognition unit 11, an angle estimation unit 12, an inter-vehicle distance estimation unit 13, a height calculation unit 14, a gradient estimation unit 15, and a display control unit 16.

Figure 3:
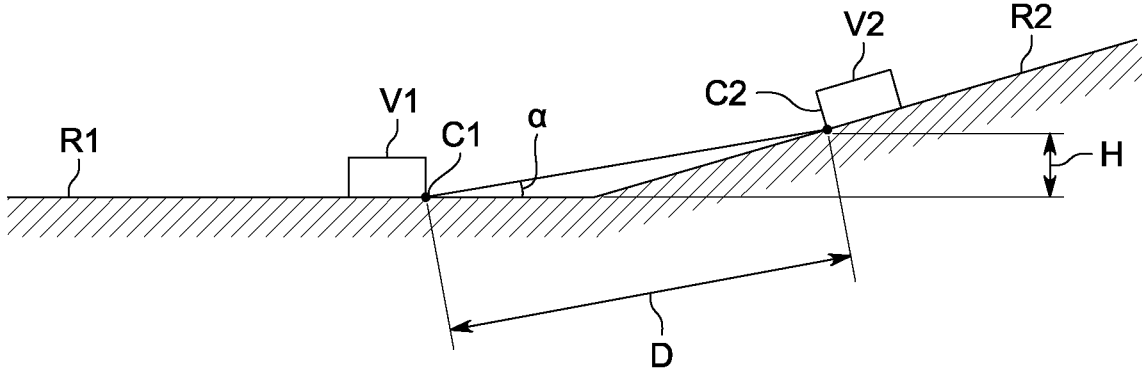
FIG. 3 is a view illustrating a method of calculating a gradient of the road ahead of the own vehicle.

The preceding vehicle recognition unit 11 recognizes, as illustrated in FIG. 3, the preceding vehicle V2 traveling ahead of the own vehicle V1 based on the image captured by the camera 2. For example, the preceding vehicle recognition unit 11 recognizes the preceding vehicle V2 by a publicly-known image processing method such as edge extraction, noise removal, pattern matching, or deep learning. The preceding vehicle recognition unit 11 recognizes a feature point C2 of the preceding vehicle V2. The feature point C2 is, for example, a lower end of a back surface of the preceding vehicle V2.

The angle estimation unit 12 estimates, based on the image captured by the camera 2, an angle α provided by a straight line connecting the own vehicle V1 and the preceding vehicle V2 with respect to the front-rear direction of the own vehicle V1. In the present embodiment, the angle α is an angle provided by a straight line connecting a feature point C1 of the own vehicle V1 and the feature point C2 of the preceding vehicle V2 with respect to the front-rear direction of the own vehicle V1. The feature point C1 is, for example, a lower end of a front surface of the own vehicle V1. In the present embodiment, the angle estimation unit 12 estimates the angle α based on a distance (the number of pixels) from a center line in parallel with the right-left direction to the feature point C2 of the preceding vehicle V2 in the image captured by the camera 2.

The inter-vehicle distance estimation unit 13 estimates an inter-vehicle distance D between the own vehicle V1 and the preceding vehicle V2 based on the detection result obtained by the radar sensor 3. The inter-vehicle distance D is a straight-line distance between the own vehicle V1 and the preceding vehicle V2. In the present embodiment, the inter-vehicle distance D is a length of a straight line connecting the feature point C1 of the own vehicle V1 and the feature point C2 of the preceding vehicle V2.

The height calculation unit 14 calculates a height H of the preceding vehicle V2 based on the angle α estimated by the angle estimation unit 12, an angle β obtained by integrating a pitch change (the angular velocity) over time by the gyroscope sensor 4 assuming an angle at the time of start of sampling of the height H as an angle θ, and the inter-vehicle distance D estimated by the inter-vehicle distance estimation unit 13. The height H of the preceding vehicle V2 is a distance between the preceding vehicle V2 and the own vehicle V1 in the height direction of the own vehicle V1. For example, when the road R1 on which the own vehicle V1 travels is a flat road in parallel with the horizontal plane, the height H of the preceding vehicle V2 is a distance between the preceding vehicle V2 and the own vehicle V1 in the vertical direction. In the present embodiment, the height H of the preceding vehicle V2 is a distance in the vertical direction between the feature point C2 of the preceding vehicle V2 and the feature point C1 of the own vehicle V1. The height calculation unit 14 calculates the height H with the use of Expression $H = D \times \sin(\alpha + \beta)$. It is to be noted that H represents the height of the preceding vehicle V2, D represents the inter-vehicle distance between the own vehicle V1 and the preceding vehicle V2, and α represents an angle provided by the straight line connecting the own vehicle V1 and the preceding vehicle V2 with respect to the front-rear direction of the own vehicle V1. Symbol β represents a change amount of the pitch angle from the time of start of sampling of the height H, assuming that the posture change of the own vehicle V1 is equivalent to the posture change of the camera 2. Further, β is an integrated value of the gyroscope sensor value (angular velocity information), and hence errors may be accumulated. Accordingly, when the gyroscope sensor value is equal to or lower than a predetermined value and sufficiently small, and is present a predetermined number of times or more (that is, when there is no change in road gradient), β and the height H are reset to zero.

Figure 4:
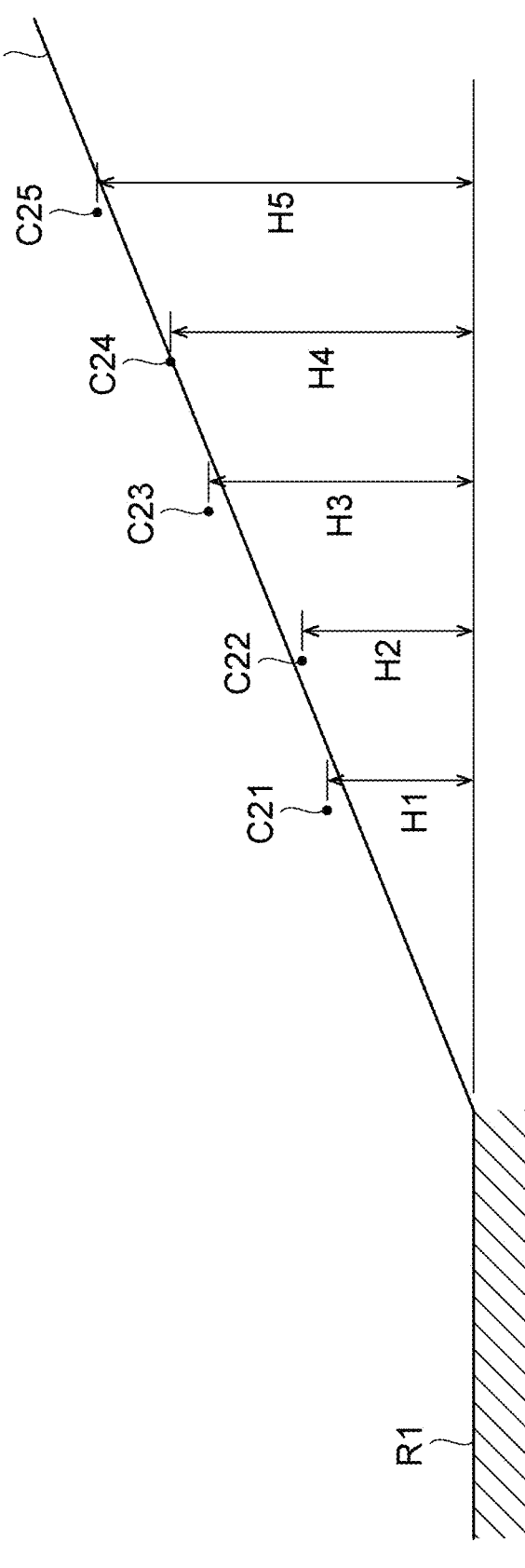
FIG. 4 is a view illustrating the method of calculating the gradient of the road ahead of the own vehicle.

The height calculation unit 14 calculates the temporal change of the height H of the preceding vehicle V2. The height calculation unit 14 successively calculates the height H of the preceding vehicle V2 for each predetermined period. The predetermined period is about several hundreds of milliseconds. In the present embodiment, the predetermined period is, for example, about 100 msec. FIG. 4 is a view illustrating the height of the preceding vehicle V2 at each time calculated by the height calculation unit 14. As illustrated in FIG. 4, the height calculation unit 14 calculates, as the height H of the preceding vehicle V2, a height H1 of a feature point C21 of the preceding vehicle V2 at first time, a height H2 of a feature point C22 of the preceding vehicle V2 at second time, a height H3 of a feature point C23 of the preceding vehicle V2 at third time, a height H4 of a feature point C24 of the preceding vehicle V2 at fourth time, a height H5 at a feature point C25 of the preceding vehicle V2 at fifth time, and the like. The height calculation unit 14 calculates the height H at least at three times.

The gradient estimation unit 15 estimates the gradient of the road R2 ahead of the own vehicle V1 based on the temporal change of the height H of the preceding vehicle V2. The gradient estimation unit 15 calculates, as the gradient of the road R2 ahead, an approximate curve L of the height positions (in the present embodiment, the feature points C21 to C25) of the preceding vehicle V2 at a plurality of times. The approximate curve L is a straight line or a curved line. In the present embodiment, the gradient estimation unit 15 calculates the approximate curve L with the use of at least three height positions of the preceding vehicle V2. When the inter-vehicle distance D is equal to or larger than a predetermined threshold value, the gradient estimation unit 15 calculates the approximate curve L with the use of a linear approximation formula. The predetermined threshold value is, for example, about several tens of meters. In the present embodiment, the predetermined threshold value is about 20 m. When the inter-vehicle distance D is smaller than the above-mentioned threshold value, the gradient estimation unit 15 calculates the approximate curve L with the use of a quadratic approximation formula.

The display control unit 16 displays the icon or the like corresponding to the lane line P' of the road R2 ahead or the like on the windshield so that the icon or the like is superimposed on the landscape ahead of the own vehicle V1. The display control unit 16 adjusts the position of the icon or the like on the windshield based on the gradient estimated by the gradient estimation unit 15.

The display control unit 16 increases an adjustment amount of the position of the icon or the like on the windshield as the gradient of the road R2 ahead is larger. When the road R2 ahead is an upslope, the display control unit 16 sets the position of the icon or the like on the windshield to be higher as the gradient of the road R2 ahead is larger. When the road R2 ahead is a downslope, the display control unit 16 sets the position of the icon or the like on the windshield to be lower as the gradient of the road R2 ahead is larger.

The display control unit 16 rotates the projection unit of the head-up display 5 to adjust the position of the icon or the like on the windshield. A rotation angle of the projection unit is an angle corresponding to the gradient of the road R2 ahead. The display control unit 16 may move the projection unit of the head-up display 5 to adjust the position of the icon or the like on the windshield. A movement amount of the projection unit is an amount corresponding to the gradient of the road R2 ahead.

Figure 5:
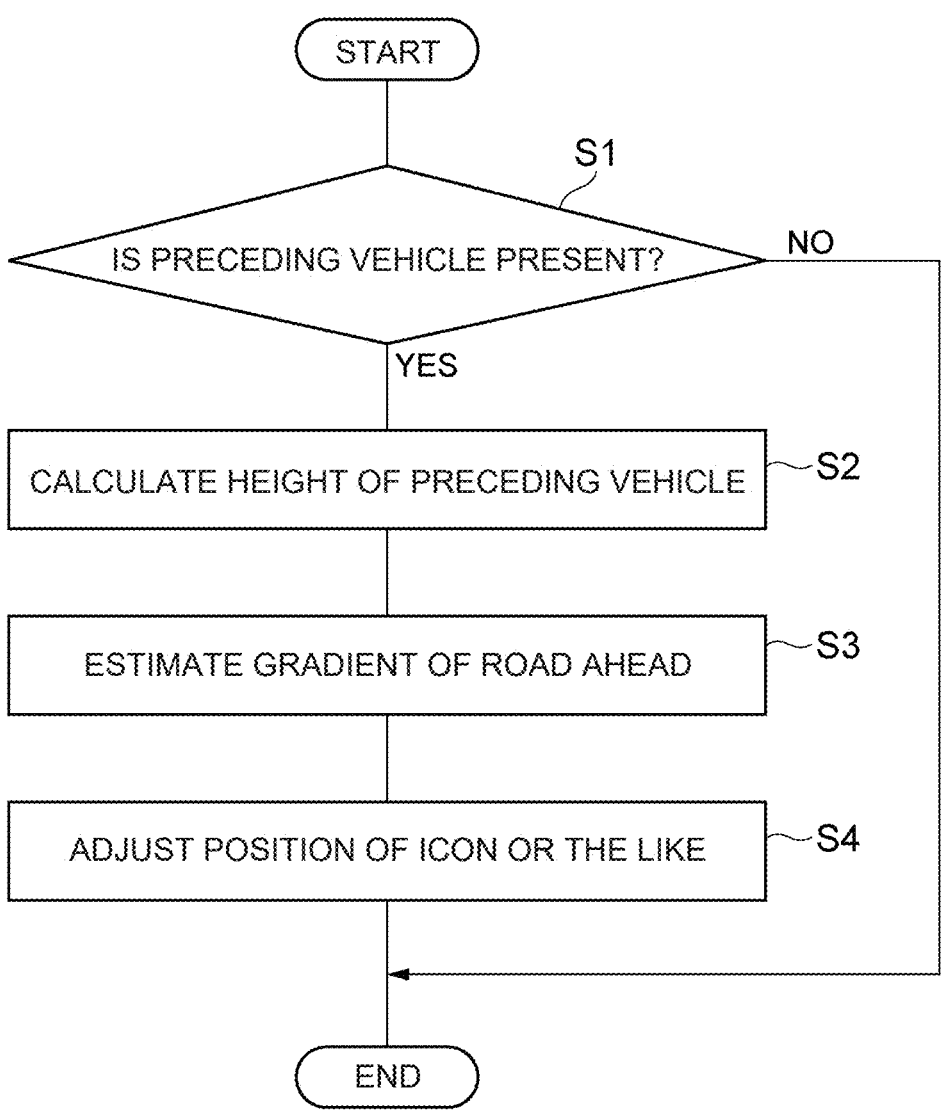
FIG. 5 is a flowchart illustrating processing performed by an ECU illustrated in FIG. 1.
Figure 6:
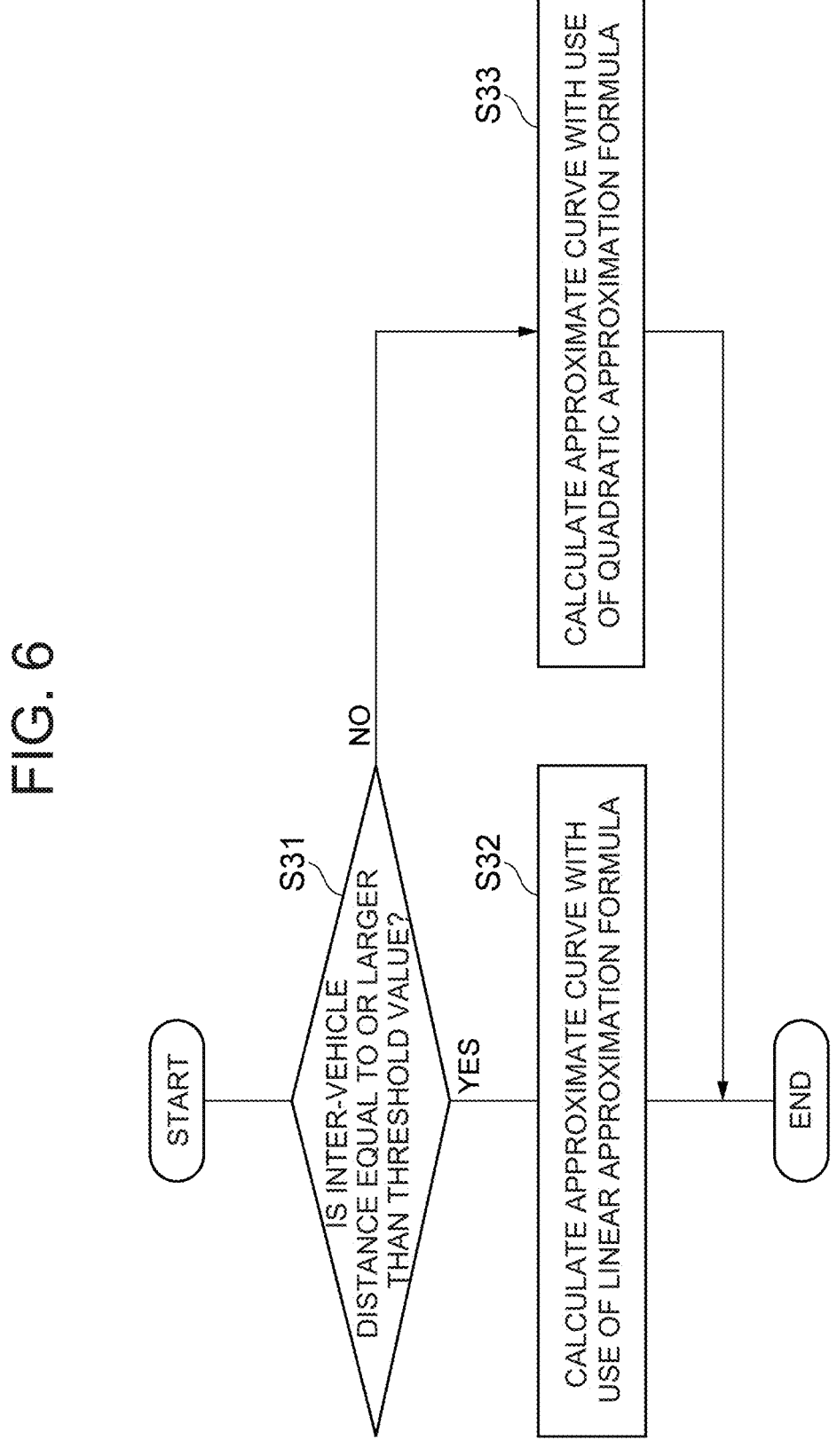
FIG. 6 is a flowchart illustrating processing performed by the ECU illustrated in FIG. 1.

Next, processing of the in-vehicle display system 1 is described. FIG. 5 and FIG. 6 are each a flowchart illustrating the processing performed by the in-vehicle display system 1.

As illustrated in FIG. 5, in step S1, the ECU 10 determines whether or not the preceding vehicle V2 is present. When the ECU 10 determines that the preceding vehicle V2 is present (step S1: YES), in step S2, the ECU 10 calculates the height H of the preceding vehicle V2. The ECU 10 successively calculates the height H of the preceding vehicle V2 for each predetermined period. When the ECU 10 determines that the preceding vehicle V2 is absent (step S1: NO), the ECU 10 ends the processing of this time.

In step S3, the ECU 10 estimates the gradient of the road R2 ahead based on the temporal change of the height H of the preceding vehicle V2. In step S4, the ECU 10 adjusts the position of the icon or the like on the windshield based on the gradient of the road R2 ahead.

FIG. 6 is a flowchart illustrating details of step S3 illustrated in FIG. 5. As illustrated in FIG. 6, in step S31, the ECU 10 determines whether or not the inter-vehicle distance D between the own vehicle V1 and the preceding vehicle V2 is equal to or larger than the above-mentioned threshold value. When the inter-vehicle distance D is equal to or larger than the above-mentioned threshold value (step S31: YES), in step S32, the ECU 10 calculates, as the gradient of the road R2 ahead, the approximate curve L with the use of the linear approximation formula. When the inter-vehicle distance D is smaller than the above-mentioned threshold value (step S31: NO), in step S33, the ECU 10 calculates, as the gradient of the road R2 ahead, the approximate curve L with the use of the quadratic approximation formula.

As described above, in the in-vehicle display system 1, the gradient estimation unit 15 estimates the gradient of the road R2 ahead of the own vehicle V1 based on the temporal change of the height H of the preceding vehicle V2, and the display control unit 16 adjusts the position of the icon or the like on the windshield based on the gradient estimated by the gradient estimation unit 15. In this manner, even when the road R2 ahead of the own vehicle V1 has a gradient, the position accuracy of the icon or the like on the windshield can be ensured. Thus, with the in-vehicle display system 1, the position accuracy of the icon or the like on the windshield can be improved.

The display control unit 16 increases the adjustment amount of the position of the icon or the like on the windshield as the gradient of the road R2 ahead is larger. In this manner, the position accuracy of the icon or the like on the windshield can be reliably ensured.

The gradient estimation unit 15 calculates, as the gradient, the approximate curve L of the height positions (the feature points C21 to C25) of the preceding vehicle V2 at a plurality of times. In this manner, the gradient of the road R2 ahead can be accurately estimated.

When the inter-vehicle distance D is equal to or larger than the above-mentioned threshold value, the gradient estimation unit 15 calculates the approximate curve L with the use of the linear approximation formula. In this manner, the gradient of the road R2 ahead can be estimated even more accurately.

When the inter-vehicle distance D is smaller than the threshold value described above, the gradient estimation unit 15 calculates the approximate curve L with the use of the quadratic approximation formula. In this manner, the gradient of the road R2 ahead can be estimated even more accurately.

The embodiment of the present disclosure has been described above, but the present disclosure is not limited to the above-mentioned embodiment. The present disclosure can be carried out in various aspects by making various modifications and improvements based on knowledge of a person skilled in the art, including the above-mentioned embodiment.

The gradient estimation unit 15 may calculate the approximate curve L with the use of two height positions of the preceding vehicle V2. In this case, the height calculation unit 14 may calculate the heights H at two times. The gradient estimation unit 15 is only required to calculate the approximate curve L with the use of a plurality of height positions of the preceding vehicle V2.

The gradient estimation unit 15 may calculate the approximate curve L with the use of a least squares method, a robust estimation method, or the like.

The preceding vehicle recognition unit 11 may recognize the preceding vehicle V2 based on both of the image captured by the camera 2 and the detection result obtained by the radar sensor 3.

When the inter-vehicle distance D is smaller than the above-mentioned threshold value, the gradient estimation unit 15 may calculate the approximate curve L with the use of a linear approximation formula.

What is claimed is:

1. An in-vehicle display system that displays an image on a display screen of a head-up display of an own vehicle, the in-vehicle display system comprising:

a preceding vehicle recognition unit that recognizes a preceding vehicle traveling ahead of the own vehicle based on an image captured by a camera of the own vehicle;

an angle estimation unit that estimates, based on the image captured by the camera, an angle provided by a straight line connecting the own vehicle and the preceding vehicle with respect to a front-rear direction of the own vehicle;

an inter-vehicle distance estimation unit that estimates an inter-vehicle distance between the own vehicle and the preceding vehicle based on a detection result obtained by a sensor of the own vehicle;

a height calculation unit that calculates a height of the preceding vehicle based on the angle estimated by the angle estimation unit and the inter-vehicle distance estimated by the inter-vehicle distance estimation unit;

a gradient estimation unit that estimates a gradient of a road ahead of the own vehicle based on a temporal change of the height of the preceding vehicle; and a display control unit that displays the image on the display screen so that the image is superimposed on a landscape ahead of the own vehicle, wherein the display control unit adjusts a position of the image on the display screen based on the gradient estimated by the gradient estimation unit.

2. The in-vehicle display system according to claim 1, wherein the display control unit increases an adjustment amount of the position of the image on the display screen as the gradient is larger.

3. The in-vehicle display system according to claim 1, wherein the gradient estimation unit calculates, as the gradient, an approximate curve of height positions of the preceding vehicle at a plurality of times.

4. The in-vehicle display system according to claim 3, wherein, when the inter-vehicle distance is equal to or larger than a predetermined threshold value, the gradient estimation unit calculates the approximate curve with use of a linear approximation formula.

5. The in-vehicle display system according to claim 3, wherein, when the inter-vehicle distance is smaller than a predetermined threshold value, the gradient estimation unit calculates the approximate curve with use of a quadratic approximation formula.

* * * * *